US 6,609,427 B1

(12) United States Patent
Westfield et al.

(10) Patent No.: US 6,609,427 B1
(45) Date of Patent: Aug. 26, 2003

(54) GAS FILL SYSTEM IN A PRESSURE TRANSMITTER

(75) Inventors: Brian L. Westfield, Victoria, MN (US); Robert C. Hedtke, Young America, MN (US); Weston Roper, St. Louis Park, MN (US); Mark C. Fandrey, Eden Prairie, MN (US); Roger L. Frick, Hackensack, MN (US); Scott D. Nelson, Plymouth, MN (US); Theodore H. Schnaare, Chaska, MN (US); Steven M. Behm, White Bear Lake, MN (US); Mark S. Schumacher, Minneapolis, MN (US)

(73) Assignee: Rosemount Inc., Eden Prairie, MN (US)

( * ) Notice: Subject to any disclaimer, the term of this patent is extended or adjusted under 35 U.S.C. 154(b) by 202 days.

(21) Appl. No.: 09/667,289

(22) Filed: Sep. 22, 2000

Related U.S. Application Data

(60) Provisional application No. 60/156,369, filed on Sep. 28, 1999.

(51) Int. Cl.$^7$ .................................................. G01L 9/00
(52) U.S. Cl. ............................ 73/753; 73/717; 73/700
(58) Field of Search ...................... 73/715, 753, 700, 73/706, 717, 756; 361/283.1, 283.4

(56) References Cited

U.S. PATENT DOCUMENTS

| 3,701,280 A | 10/1972 | Stroman | 73/194 |
| 3,968,694 A | 7/1976 | Clark | 73/398 |
| 4,120,206 A | 10/1978 | Rud, Jr. | 73/718 |
| 4,125,027 A | 11/1978 | Clark | 73/724 |
| 4,238,825 A | 12/1980 | Geery | 364/510 |
| 4,250,490 A | 2/1981 | Dahlke | 340/870.37 |
| 4,287,501 A | 9/1981 | Tominaga et al. | 338/42 |
| 4,414,634 A | 11/1983 | Louis et al. | 364/510 |
| 4,419,898 A | 12/1983 | Zanker et al. | 73/861.02 |
| 4,446,730 A | 5/1984 | Smith | 73/301 |
| 4,455,875 A | 6/1984 | Guimard et al. | 73/708 |
| 4,485,673 A | 12/1984 | Stern | 73/304 |
| 4,528,855 A | 7/1985 | Singh | 73/721 |

(List continued on next page.)

FOREIGN PATENT DOCUMENTS

| DE | 37 41 648 A1 | 7/1988 |
| DE | G 91 09 176.4 | 10/1991 |
| DE | 197 45 244 A1 | 4/1998 |

(List continued on next page.)

OTHER PUBLICATIONS

International Search Report from the European Patent Office for International Application No. PCT/US 01/14521 filed May 4, 2001.
U.S. patent application Ser. No. 09/671,495, Behm et al., filed Sep. 27, 2000.

(List continued on next page.)

Primary Examiner—Hezron Williams
Assistant Examiner—Jermaine Jenkins
(74) Attorney, Agent, or Firm—Westman, Champlin & Kelly, P.A.

(57) ABSTRACT

A pressure transmitter with a hermetically sealed housing surrounding a cavity that is filled with a gas that is free of integrated circuit contaminants. A sensor circuit including an integrated circuit is placed in the cavity and a gas fill port on the housing is sealed. The sensor circuit is electrically adjustable from outside the pressure transmitter and the integrated circuit is protected from contaminated atmospheres outside the pressure transmitter.

22 Claims, 6 Drawing Sheets

U.S. PATENT DOCUMENTS

| | | | |
|---|---|---|---|
| 4,562,744 A | 1/1986 | Hall et al. | 73/861.02 |
| 4,598,381 A | 7/1986 | Cucci | 364/558 |
| 4,602,344 A | 7/1986 | Ferretti et al. | 364/509 |
| 4,617,607 A | 10/1986 | Park et al. | 361/283 |
| D287,827 S | 1/1987 | Broden | D10/46 |
| 4,644,797 A | 2/1987 | Ichikawa et al. | 73/706 |
| 4,653,330 A | 3/1987 | Hedtke | 73/756 |
| 4,677,841 A | 7/1987 | Kennedy | 73/30 |
| 4,745,810 A | 5/1988 | Pierce et al. | 73/706 |
| D296,995 S | 8/1988 | Lee | D10/46 |
| D297,314 S | 8/1988 | Hedtke | D10/46 |
| D297,315 S | 8/1988 | Pierce et al. | D10/85 |
| 4,783,659 A | 11/1988 | Frick | 340/870.37 |
| 4,791,352 A | 12/1988 | Frick et al. | 324/60 |
| 4,798,089 A | 1/1989 | Frick et al. | 73/706 |
| 4,818,994 A | 4/1989 | Orth et al. | 340/870.21 |
| 4,825,704 A | 5/1989 | Aoshima et al. | 73/861.42 |
| 4,833,922 A | 5/1989 | Frick et al. | 73/756 |
| 4,850,227 A | 7/1989 | Luettgen et al. | 73/708 |
| 4,866,989 A | 9/1989 | Lawless | 73/756 |
| 4,881,412 A | 11/1989 | Northedge | 73/861.04 |
| 4,930,353 A | 6/1990 | Kato et al. | 73/727 |
| 4,958,938 A | 9/1990 | Schwartz et al. | 374/208 |
| 4,970,898 A | 11/1990 | Walish et al. | 73/706 |
| 4,980,675 A | 12/1990 | Meisenheimer, Jr. | 340/626 |
| 5,000,047 A | 3/1991 | Kato et al. | 73/706 |
| D317,266 S | 6/1991 | Broden et al. | D10/46 |
| D317,269 S | 6/1991 | Selg | D10/52 |
| D318,432 S | 7/1991 | Broden et al. | D10/46 |
| 5,028,746 A | 7/1991 | Petrich | 191/12.2 R |
| 5,035,140 A | 7/1991 | Daniels et al. | 73/290 |
| 5,051,937 A | 9/1991 | Kawate et al. | 364/571.01 |
| 5,058,437 A | 10/1991 | Chaumont et al. | 73/861.21 |
| 5,060,108 A | 10/1991 | Baker et al. | 361/283 |
| 5,070,732 A | 12/1991 | Duncan et al. | 73/431 |
| 5,083,091 A | 1/1992 | Frick et al. | 324/678 |
| 5,087,871 A | 2/1992 | Losel | 323/299 |
| 5,094,109 A | 3/1992 | Dean et al. | 73/718 |
| D329,619 S | 9/1992 | Cartwright | D10/52 |
| 5,142,914 A | 9/1992 | Kusakabe et al. | 73/723 |
| 5,157,972 A | 10/1992 | Broden et al. | 73/718 |
| 5,162,725 A | 11/1992 | Hodson et al. | 324/115 |
| 5,187,474 A | 2/1993 | Kielb et al. | 340/870.18 |
| 5,212,645 A | 5/1993 | Wildes et al. | 364/463 |
| 5,227,782 A | 7/1993 | Nelson | 340/870.11 |
| 5,236,202 A | 8/1993 | Krouth et al. | 277/164 |
| 5,245,333 A | 9/1993 | Anderson et al. | 340/870.3 |
| 5,248,167 A | 9/1993 | Petrich et al. | 285/23 |
| D342,456 S | 12/1993 | Miller et al. | D10/60 |
| 5,276,631 A | 1/1994 | Popovic et al. | 364/571.04 |
| 5,287,746 A | 2/1994 | Broden | 73/706 |
| 5,353,200 A | 10/1994 | Bodin et al. | 361/816 |
| 5,369,386 A | 11/1994 | Alden et al. | 335/206 |
| 5,377,547 A | 1/1995 | Kusakabe et al. | 73/723 |
| 5,381,355 A | 1/1995 | Birangi et al. | 364/724.01 |
| D358,784 S | 5/1995 | Templin, Jr. et al. | D10/96 |
| 5,436,824 A | 7/1995 | Royner et al. | 363/89 |
| 5,448,180 A | 9/1995 | Kienzler et al. | 326/15 |
| 5,469,150 A | 11/1995 | Sitte | 340/825.07 |
| 5,471,885 A | 12/1995 | Wagner | 73/862.041 |
| D366,000 S | 1/1996 | Karas et al. | D10/60 |
| D366,218 S | 1/1996 | Price et al. | D10/52 |
| 5,495,768 A | 3/1996 | Louwagie et al. | 73/706 |
| 5,498,079 A | 3/1996 | Price | 374/208 |
| 5,502,659 A | 3/1996 | Braster et al. | 364/571.01 |
| 5,524,333 A | 6/1996 | Hogue et al. | 29/593 |
| 5,524,492 A | 6/1996 | Frick et al. | 73/706 |
| 5,546,804 A | 8/1996 | Johnson et al. | 73/431 |
| 5,600,782 A | 2/1997 | Thomson | 395/182.02 |
| 5,606,513 A | 2/1997 | Louwagie et al. | 364/510 |
| 5,650,936 A | 7/1997 | Loucks et al. | 364/483 |
| 5,656,782 A | 8/1997 | Powell, II et al. | 73/756 |
| 5,665,899 A | 9/1997 | Willcox | 73/1.63 |
| 5,668,322 A | 9/1997 | Broden | 73/756 |
| 5,669,713 A | 9/1997 | Schwartz et al. | 364/557 |
| 5,670,722 A | 9/1997 | Moser et al. | 73/756 |
| 5,677,476 A | 10/1997 | McCarthy et al. | 73/29.01 |
| 5,710,552 A | 1/1998 | McCoy et al. | 340/870.21 |
| 5,754,596 A | 5/1998 | Bischoff et al. | 375/295 |
| 5,764,928 A | 6/1998 | Lancott | 395/285 |
| 5,823,228 A | 10/1998 | Chou | 137/597 |
| 5,870,695 A | 2/1999 | Brown et al. | 702/138 |
| 5,899,962 A * | 5/1999 | Louwagie et al. | 702/138 |
| 5,920,016 A | 7/1999 | Broden | 73/756 |
| 5,948,988 A | 9/1999 | Bodin | 73/706 |
| 5,954,526 A | 9/1999 | Smith | 439/136 |
| 5,955,684 A | 9/1999 | Gravel et al. | 73/866.5 |
| 5,973,942 A | 10/1999 | Nelson et al. | 363/21 |
| 5,983,727 A * | 11/1999 | Wellman et al. | 73/724 |
| 5,988,203 A | 11/1999 | Hutton | 137/597 |
| 6,005,500 A | 12/1999 | Gaboury et al. | 341/43 |
| 6,006,338 A | 12/1999 | Longsdorf et al. | 713/340 |
| 6,038,927 A | 3/2000 | Karas | 73/706 |
| 6,050,145 A | 4/2000 | Olson et al. | 73/706 |
| 6,059,254 A | 5/2000 | Sundet et al. | 248/678 |
| 6,105,437 A | 8/2000 | Klug et al. | 73/756 |
| 6,111,888 A | 8/2000 | Green et al. | 370/461 |
| 6,115,831 A | 9/2000 | Hanf et al. | 714/43 |
| 6,123,585 A | 9/2000 | Hussong et al. | 439/652 |
| 6,131,467 A | 10/2000 | Miyano et al. | 73/756 |
| 6,140,952 A | 10/2000 | Gaboury | 341/143 |
| 6,151,557 A | 11/2000 | Broden et al. | 702/47 |
| 6,216,172 B1 | 4/2001 | Koblin et al. | 709/253 |
| 6,233,532 B1 | 5/2001 | Boudreau et al. | 702/89 |
| 6,285,964 B1 | 9/2001 | Babel et al. | 702/121 |
| 6,295,875 B1 | 10/2001 | Frick et al. | 73/718 |
| 6,311,568 B1 | 11/2001 | Kleven | 73/861.42 |
| 6,321,166 B1 | 11/2001 | Evans et al. | 702/50 |

FOREIGN PATENT DOCUMENTS

| | | |
|---|---|---|
| DE | 299 03 260 U1 | 5/2000 |
| EP | 0 063 685 A1 | 11/1982 |
| EP | 0 167 941 A2 | 6/1985 |
| EP | 0 214 801 A1 | 3/1987 |
| EP | 0 223 300 A2 | 5/1987 |
| EP | 639039 A1 | 2/1995 |
| EP | 0 903 651 A1 | 3/1999 |
| JP | 2000121470 | 10/1998 |
| WO | WO 88/01417 | 2/1988 |
| WO | WO 89/02578 | 3/1989 |
| WO | WO 89/04089 | 5/1989 |
| WO | WO 90/15975 | 12/1990 |
| WO | WO 91/18266 | 11/1991 |
| WO | WO 96/34264 | 10/1996 |
| WO | WO 98/48489 | 10/1998 |
| WO | WO 00/23776 | 4/2000 |

OTHER PUBLICATIONS

U.S. patent application Ser. No. 09/519,781, Neslon et al., filed Mar. 7, 2000.

U.S. patent application Ser. No. 09/520,292, Davis et al., filed Mar. 7, 2000.

U.S. patent application Ser. No. 09/519,912, Nelson et al., filed Mar. 7, 2000.

U.S. patent application Ser. No. 09/672,338, Nelson et al., filed Sep. 28, 2000.

U.S. patent application Ser. No. 09/556,506, Westfield et al., filed May 15, 2000.

U.S. patent application Ser. No. 09/571,111, Nord et al., filed May 4, 2000.

U.S. patent application Ser. No. 09/667,399, Behm et al., filed Sep. 21, 2000.

U.S. patent application Ser. No. 09/671,130, Fandrey et al., filed Sep. 27, 2000.

U.S. patent application Ser. No. 29/120,531, Fandrey et al., filed Mar. 21, 2000.

U.S. patent application Ser. No. 29/120,538, Fandrey et al., filed Mar. 21, 2000.

U.S. patent application Ser. No. 29/120,544, Fandrey et al., filed Mar. 21, 2000.

U.S. patent application Ser. No. 29/120,552, Fandrey et al., filed Mar. 21, 2000.

U.S. patent application Ser. No. 29/120,537, Fandrey et al., filed Mar. 21, 2000.

U.S. patent application Ser. No. 29/120,553, Fandrey et al., filed Mar. 21, 2000.

U.S. patent application Ser. No. 09/638,181, Roper et al., filed Mar. 21, 2000.

Product Data Sheet No: 00813–0100–4378, "Model 751 Field Signal Indicator", by Rosemount Inc., Eden Prairie, Minnesota, (1997).

Product Data Sheet No: 00813–0100–4731, "APEX™ Radar Gauge", by Rosemount Inc., Eden Prairie, Minnesota, (1998).

Product Data Sheet No: 00813–0100–4640, "Model 3201 Hydrostatic Interface Unit", from the Rosemount Comprehensive Product Catalog, published 1998, by Rosemount Inc., Eden Prairie, Minnesota.

Product Data Sheet No: 00813–0100–4003, "Model 8800A", by Rosemount Inc., Eden Prairie, Minnesota, (1998).

Product Data Sheet No: 00813–0100–4733, "Model 8742C—Magnetic Flowmeter Transmitter with Foundation™ Fieldbus", from the Rosemount Comprehensive Product Catalog, published 1998, by Rosemount Inc., Eden Prairie, Minnesota.

"Rosemount Model 8732C Magnetic Flowmeter Transmitter", by Rosemount Inc., Eden Prairie, Minnesota, (1998).

Product Data Sheet No: 00813–0100–4263, "Model 444 Alphaline® Temperature Transmitters", by Rosemount Inc., Eden Prairie, Minnesota, (1997).

Product Data Sheet No: 00813–0100–4769, "Model 3244MV Multivariable Temperature Transmitter with Foundation™ Fieldbus", by Rosemount Inc., Eden Prairie, Minnesota, (1998).

Product Data Sheet No: 00813–0100–4724, "Models 3144 and 3244MV Smart Temperature Transmitters", by Rosemount Inc., Eden Prairie, Minnesota, (1998).

Product Data Sheet No: 00813–0100–4738, "Model 3095FB Multivariable™ Transmitter with Modbus™ Protocol", by Rosemount Inc., Eden Prairie, Minnesota, (1996, 1997).

Product Data Sheet No: 00813–0100–4001, "Model 3051 Digital Pressure Transmitter for Pressure, Flow, and Level Measurement", by Rosemount Inc., Eden Prairie, Minnesota, (1998).

Product Data Sheet No: 00813–0100–4698, "Model 2090F Sanitary Pressure Transmitter", by Rosemount Inc., Eden Prairie, Minnesota, (1998).

Product Data Sheet No: 00813–0100–4690, "Model 2088 Economical Smart Pressure Transmitter", by Rosemount Inc., Eden Prairie, Minnesota, (1998).

Product Data Sheet No: 00813–0100–4592, "Model 2024 Differential Pressure Transmitter", by Rosemount Inc., Eden Prairie, Minnesota, (1987–1995).

Product Data Sheet No: 00813–0100–4360, "Model 1151 Alpaline® Pressure Transmitters", by Rosemount Inc., Eden Prairie, Minnesota, (1998).

Product Data Sheet No: 00813–0100–4458, "Model 1135F Pressure–to–Current Converter", by Rosemount Inc., Eden Prairie, Minnesota, (1983, 1986, 1994).

"Single Chip Senses Pressure and Temperature," *Machine Design,* 64 (1992) May 21, No. 10.

Brochure: "Reduce Unaccounted–For Natural Gas with High–Accuracy Pressure Transmitters," Rosemount Inc. Measurement Division, Eden Prairie, Minnesota, ADS 3073, May 1991, pp. 1–4.

Technical Information Bulletin, "Liquid Level Transmitter Model DB40RL Sanitary Sensor deltapilot," Endress + Hauser, Greenwood, Indiana, Sep. 92, pp. 1–8.

"The Digitisation of Field Instruments" W. Van Der Bijl, *Journal A,* vol. 32, No. 3, 1991, pp. 62–65.

Specification Summary, "Teletrans™ 3508–30A Smart Differential Pressure Transmitter," (undated) Bristol Babcock, Inc., Watertown, CT, 06795.

Specification Summary, "Teletrans™ 3508–10A Smart Pressure Transmitter," (undated) Bristol Babcock, Inc., Watertown, CT, 06795.

Specification Summary, "AccuRate Advanced Gas Flow Computer, Model GFC 3308," (undated) Bristol Babcock, Inc., Watertown, CT, 06795.

Product Data Sheet PDS 4640, "Model 3201 Hydrostatic Interface Unit," Mar. 1992, Rosemount Inc., Eden Prairie, MN 55344.

Product Data Sheet PDS 4638, "Model 3001CL Flush––Mount Hydrostatic Pressure Transmitter," Jul. 1992, Rosemount Inc., Eden Prairie, MN 55344.

"Flow Measurement," *Handbook fo Fluid Dynamics,* V. Streeter, Editor–in–chief, published by McGraw–Hill Book Company, Inc. 1961, pp. 14–4 to 14–15.

"Precise Computerized In–Line Compressible Flow Metering," *Flow—Its Measurement and Control in Science and Industry,* vol. 1, Part 2, Edited by R. Wendt, Jr., Published by American Institute of Physics et al, (undated) pp. 539–540.

"A Systems Approach," Dr. C. Ikoku, *Natural Gas Engineering,* PennWell Books, (undated) pp. 256–257.

"Methods for Volume Measurement Using Tank–Gauging Devices Can Be Error Prone," F. Berto, *The Advantages of Hydrostatic Tank Gauging Systems,* undated reprint from *Oil & Gas Journal.*

Hydrostatic Tank Gauging—Technology Whose Time Has Come, J. Berto, *Rosemount Measurement Division Product Feature,* undated reprint from *INTECH.*

"Pressure Sensors Gauge Tank Level and Fluid Density," *Rosemount Measurement Division Product Feature,* undated reprint from *Prepared Foods* (Copyrighted 1991 by Gorman Publishing Company).

"Low Cost Electronic Flow Measurement System," *Tech Profile,* May 1993, Gas Research Institute, Chicago, IL.

"Development of an Integrated EFM Device for Orifice Meter Custody Transfer Applications," S. D. Nieberle et al., *American Gas Association Distribution/Transmission Conference & Exhibit,* May 19, 1993.

Advertisement, AccuRate Model 3308 Integral Smart DP/P/T Transmitter, (undated) Bristol Babcock, Inc., Watertown, CT 06795.

Advertisement, Model 3508 DP Transmitter, *Control Engineering,* Dec. 1992, Bristol Babcock, Inc., Watertown, CT 06795.

"Smart Transmitters Tear Up The Market," C. Polsonetti, *INTECH,* Jul. 1993, pp. 42–45.

"MicroLAN Design Guide", Dallas Semiconductor, Tech Brief No. 1, (undated).

"Bosch Can Specification Version 2.0", by Robert Bosch GmbH, pp. 1–68 including pp. –1– and –2–, (Sep. 1991).

Product Data Sheet No. 00813–0100–4001, "Digital Pressure Transmitter for Pressure, Flow, and Level Measurement", by Rosemount Inc., (1998).

"Claudius Ptolemy (100?–170? AD)", *M&News,* 7 pages, (Apr. 1994).

American National Standard , "Hydraulic Fluid Power–Solenoid Piloted Industrial Valves–Interface Dimensions for Electrical Connectors", National Fluid Power Association, Inc., 10 pages, (Aug. 1981).

2 pages downloaded from http://www.interlinkbt.com/product/ibt_prod/dn/cn–dm_pn/euro.dp.htm dated Sep. 15, 2000.

4 pages downloaded from http://www.interlinkbt.com/product/ibt_prod/dn/eur–con/euro–fwc.htm dated Sep. 15, 2000.

3 pages from TURK Cable Standards, by Turk, Inc., Minneapolis, Minnesota.

"Notification of Transmittal of the International Search Report or the Declaration" of International Application No. PCT/US00/26563.

"Notification of Transmittal of the International Search Report or the Declaration" for International Application No. PCT/US00/26488.

"Notification of Transmittal of the International Search Report or the Declaration" for International Application No. PCT/US00/26561.

"Notification of Transmittal of the International Search Report or the Declaration" PCT/US01/13993.

U.S. patent application Ser. No. 09/862,762, Wang, filed May 21, 2001.

U.S. patent application Ser. No.029/867,961, Fandrey et al., filed May 30, 2001.

\* cited by examiner

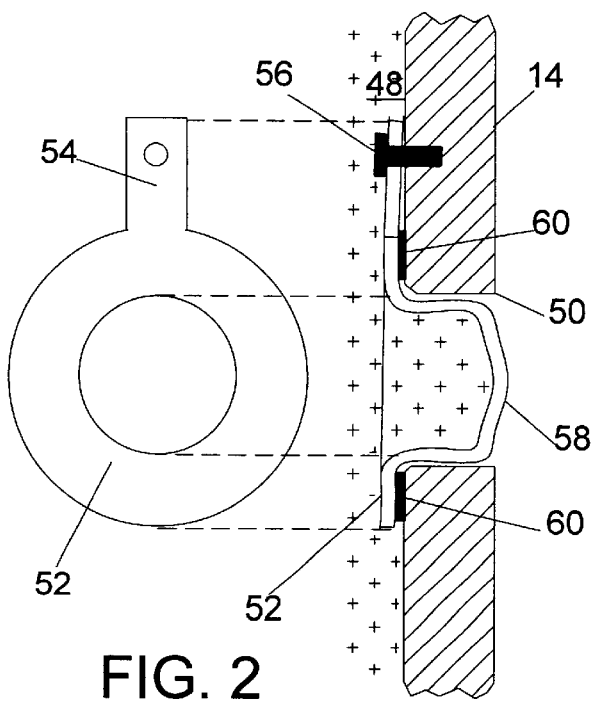
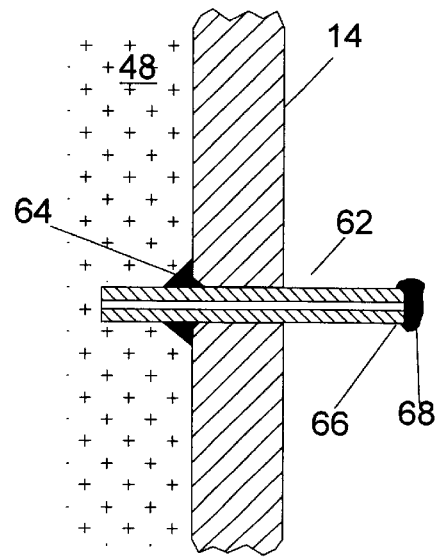
FIG. 2
FIG. 3
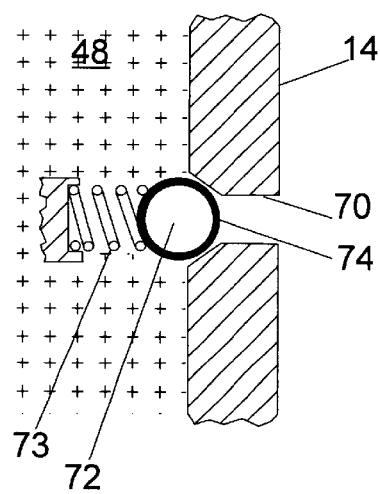
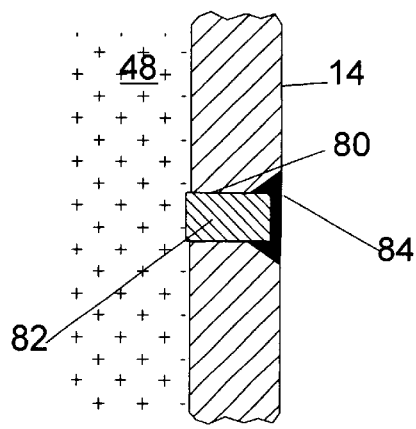
FIG. 4
FIG. 5

GAS FILL SYSTEM IN A PRESSURE TRANSMITTER

REFERENCE TO CO-PENDING APPLICATION

This application claims priority benefits from U.S. provisional patent application No. 60/156,369 entitled UNITIZED MODULARITY IN A PROCESS TRANSMITTER filed on Sep. 28, 1999.

BACKGROUND OF THE INVENTION

The present invention relates to pressure transmitters used to measure fluid pressures in industrial fluid processing plants. In particular, the present invention relates to the performance of such pressure transmitters in contaminated atmospheres that degrade the performance of electronic circuitry.

Electronic circuits in pressure transmitters are known to be sensitive to contamination from the atmospheres in industrial fluid processing plants. Such atmospheres can include humidity, fluorinated or chlorinated compounds and other contaminants that can degrade the performance of pressure transmitter circuitry. Sensitive silicon transistors or integrated circuits can be poisoned, microscopic bond wires can be corroded, or overall circuit performance can be degraded by leakage on circuit boards, all due to atmospheric contaminants.

Typically, silicon devices used for critical functions in pressure transmitters are protected in expensive hermetically sealed integrated circuit packages, such as an hermetic TO-5 metal can or hermetic ceramic dual-in-line package (DIP). Printed circuit boards in pressure transmitters are usually sprayed, brushed or dipped in a special moisture and fungus resistant varnish or conformal coating to reduce electrical leakage and damage due to contaminants, which is also expensive.

The transmitter circuit boards are then enclosed in a metal housing that has threaded covers and O-ring seals to provide an additional barrier to contamination. The threaded covers, however, need to be opened by technicians in the contaminated plant environment in order to make manual circuit adjustments such as adjusting calibration or setting configuration jumpers. When the threaded covers are replaced after adjustment, moisture and other contaminants can become trapped in the housings, and long term transmitter reliability is compromised.

A method of making a pressure transmitter, and a pressure transmitter are needed where the transmitter has an adjustable transmitter circuit that is protected from contaminated industrial atmospheres e without the use of expensive hermetic integrated circuit packages and special conformal coatings.

SUMMARY OF THE INVENTION

A pressure transmitter is disclosed with a sealed housing surrounding a cavity that is filled with a fill gas that is free of integrated circuit contaminants. A sensor circuit including an integrated circuit is placed in the cavity and a gas fill port on the housing is permanently sealed. The sensor circuit is electrically adjustable from outside the pressure transmitter and the transmitter's housing does not need to be opened for adjustment. The integrated circuit is surrounded by the fill gas and protected from contaminated atmospheres present outside the transmitter.

In a preferred embodiment, the integrated circuit includes an economical non-hermetic integrated circuit package.

BRIEF DESCRIPTION OF THE DRAWINGS

FIG. 2 is an illustration of an alternative fill port that includes a pressurization indication;

FIG. 3 is an illustration of an alternative fill port including a capillary tube in a housing wall;

FIG. 4 is an illustration of an alternative fill port that is sealed by a spring-loaded ball that is coated with solder or braze material;

FIG. 5 is an illustration of an alternative fill port that includes a pin that is brazed or soldered in into a housing;

DETAILED DESCRIPTION OF THE ILLUSTRATED EMBODIMENTS

In the present invention, an improved pressure transmitter includes a permanently sealed housing surrounding a cavity. The open space in the cavity is filled with a fill gas that is free of integrated circuit contaminants such as moisture or chlorinated or fluorinated compounds. A sensor circuit including one or more integrated circuits is placed in the cavity, surrounded by the fill gas, and protected from contaminated atmospheres outside the pressure transmitter. A gas fill port such as a capillary tube is closed off at its outer end to seal the housing, permanently trapping the clean fill gas in the cavity. The sensor circuit is made so that it is electrically adjustable or programmable from outside the sealed housing. The housing can be permanently sealed and low cost integrated circuits with non-hermetic packages such as surface mount or plastic packages can be used without degrading circuit performance or long-term reliability. Low cost printed circuit boards without conformal coatings or moisture protection of any kind can also be used. Many low cost fill gasses can be used including inert gasses such as helium or argon, nitrogen, or even pure dry air. Fill gasses that are free of oxygen are preferred, and the housing is also preferably constructed to be explosion proof for use in hazardous industrial locations.

Figure 1:
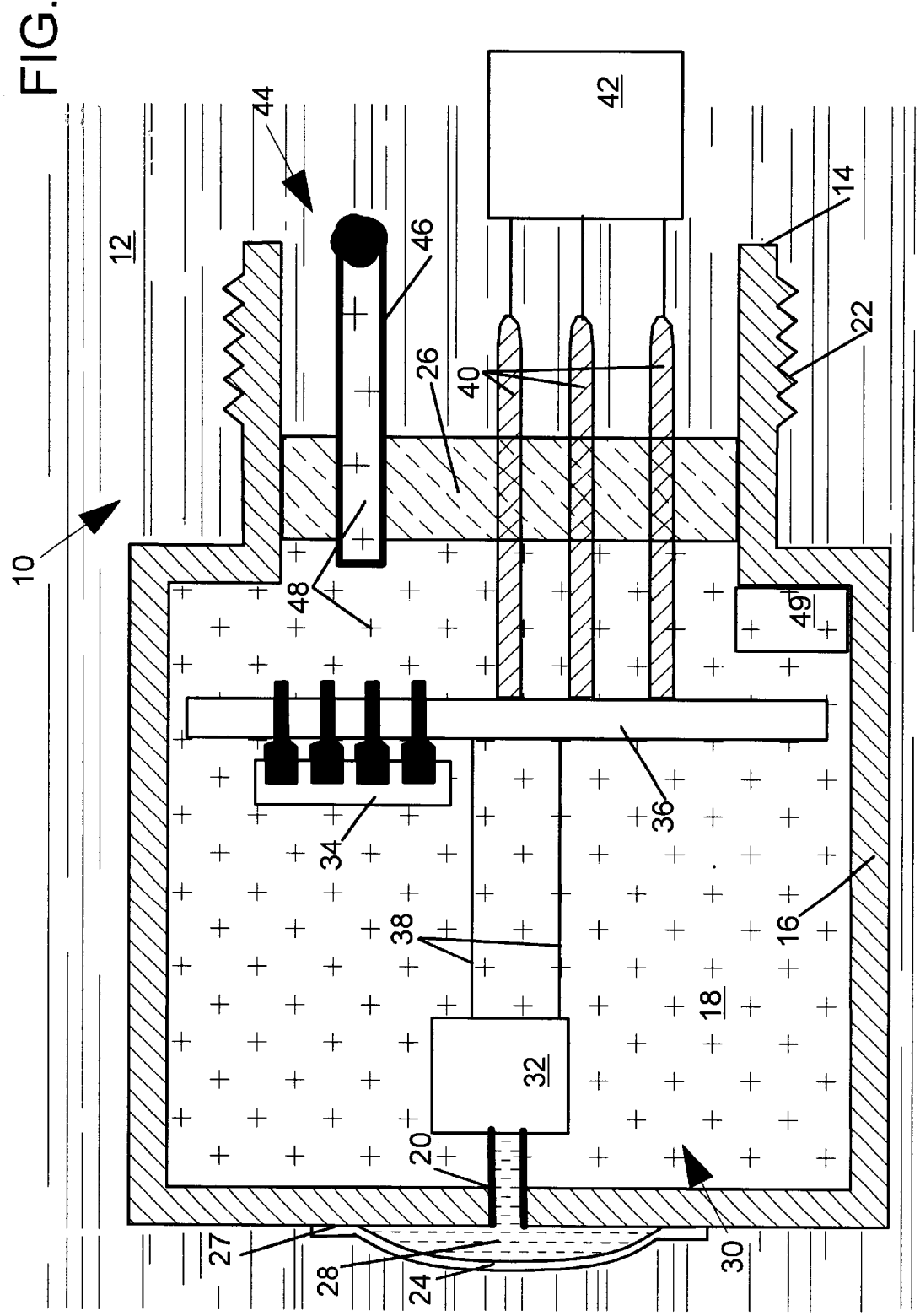
FIG. 1 is a schematic cross-sectional illustration of a first embodiment of a pressure transmitter.

In FIG. 1, a pressure transmitter 10 is schematically illustrated in a contaminated industrial plant atmosphere 12. Atmosphere 12 can include high levels of moisture, chlorinated or fluorinated compounds, or other contaminants that can degrade the performance or reliability of integrated circuits or printed circuit boards.

Pressure transmitter 10 includes a housing 14 that has an outer wall 16 surrounding a cavity 18. The outer wall 16 is preferably formed of a metal such as stainless steel or aluminum, and is assembled or joined together at welded, brazed or soldered seams (not illustrated) to ensure good hermeticity. The outer wall 16 has a fluid pressure inlet 20 and an electrical connector shell 22 passing through the outer wall 16 of housing 14. The connector shell 22 and the pressure inlet 20 are preferably integrally formed in the outer wall 16.

The housing 14 also includes an isolator seal 24 over the fluid pressure inlet 20 and a feedthrough seal 26 in the connector shell 22. The isolator seal 24 (also called an isolator diaphragm or isolator membrane) is preferably formed of metal such as stainless steel and joined to the outer wall 16 by a joint 27 that is brazed, soldered or welded such that the pressure inlet 20 is sealed off with a high degree of hermeticity. The inlet 20 and the isolator seal 24 are filled with a pressure communicating liquid 28 such as silicone oil. Alternatively, the isolator seal 24 and the liquid 28 can be omitted, and a sensor 32 connected to the inlet 20 can be relied upon to provide a hermetic seal for the inlet 20. Sensor 32 is preferably a capacitive pressure sensor, although a strain gage sensor can be used as well.

The housing 14 is typically provided with a threaded inlet (not illustrated in FIG.1) surrounding the inlet 20 so that a pressurized process fluid can be conveniently connected to the transmitter 10 for pressure measurement. The threaded inlet can be a threaded pipe fitting or a flange with threaded bolts.

The feedthrough seal 26 is formed of a fired ceramic material that forms a ceramic-to-metal seal with the connector shell 22 with a high degree of hermeticity. The term "ceramic," as applied to the feedthrough seal 26, includes fired materials that are electrically insulating and that seal to metal. This includes materials that are fully or partially sintered or fully or partially glassy and single crystal materials. Glass and alumina are preferred materials. It will be understood by those skilled in the art that sintered ceramics can include sintering additives such as glassy material near surfaces that seal to metals to improve hermeticity. The ceramic-to-metal seal can be formed by solder, braze, reaction bonding or other known bonding methods.

Transmitter 10 also includes a sensor circuit 30 that includes the pressure sensor 32 coupled to the fluid pressure inlet 20 and an integrated circuit 34 disposed on a circuit board 36 in the cavity 18. The pressure sensor 32 is coupled by leads 38 to the circuit board 36. The sensor circuit 30 further includes electrical contacts 40 coupled directly or indirectly to the integrated circuit 34. The electrical contacts are sealed in the feedthrough seal 26. The circuit 30 is an electrically adjustable circuit and the electrical contacts 40 are adapted to transmit a transmitter output representing pressure and receive an electrical adjustment signal in communication with a utilization circuit 42.

Typically the transmitter output will be a 4–20 mA analog current that provides all of the electrical energization for transmitter 10, and the electrical adjustment signal will be a higher frequency digital signal that is superimposed on the lower frequency 4–20mA analog signal. The format of the adjustment signal can be a HART protocol signal, a Foundation Fieldbus signal, Profibus or other known bidirectional communication protocols.

The transmitter 10 has a gas fill system 44 that includes a fill port 46 that is sealed in the feedthrough seal 26 of housing 14, and a fill gas 48 that fills open spaces in the cavity 18. The fill port 46 is preferably a capillary tube that passes through feedthrough seal 46 and the end of the capillary tube is preferably closed by solder, braze or welding to provide high hermeticity.

The fill gas 48 is substantially free of integrated circuit contaminants and is permanently sealed in the cavity 18. The fill gas 48 is preferably dry air, nitrogen or an inert gas. A quantity of desiccant material 49 can also be included in the cavity 18 to enhance long term reliability. While dry air can be used for the fill gas 48, a fill gas that is free of oxygen provides the additional advantage of not supporting combustion.

The housing 14 is preferably made thick enough to meet industry standards for explosion proofing. In this preferred arrangement, even if the isolator seal 24 breaks and flammable process liquids leak in and contact sparking circuits on the circuit board 36, any resulting explosion is contained in the housing because the housing is explosion proof.

The fill gas 48 is preferably pressurized at a gas pressure above atmospheric pressure. In this preferred arrangement, even if there are microscopic leaks over time in the housing 16, the pressurization of the fill gas 48 will force fill gas 48 out of the transmitter 10 for a long period of time, rather than sucking in moisture or contaminants from the surrounding contaminated atmosphere 12. The large volume of fill gas 48 in the open spaces of cavity 18 provides a large reserve of pressurized gas to supply the microscopic leaks with a purging gas so that contaminants do not leak back into the cavity 18.

One or more integrated circuits 34 in the pressure transmitter 10 can have economical non-hermetic integrated circuit package such as plastic integrated circuit packages, frit-sealed ceramic packages or even surface mount packages. Conformal coatings are not required for protection and the high hermeticity of the sealed transmitter housing 14 and the benign surroundings provided by fill gas 48 protect the integrated circuit 34 from contamination. In a preferred embodiment, the transmitter includes multiple integrated circuits 34, including an MOS sigma-delta modulator for detecting pressure signals and a modem for processing adjustment signals.

Pressure transmitter 10 is illustrated only schematically and can have a shape that is adapted to fit the needs of the application, including one or more threaded fittings to connect the transmitter 10 to pressurized process fluids, and an electrical connector shell 22 adapted to fit the desired electrical wiring, terminal or wiring compartment arrangement for a particular application. If desired, an additional wiring or circuit compartment can be mounted on connector shell 22. Generally cylindrical housing shapes are preferred for ease of manufacture and sealing.

In FIGS. 2–5, alternative gas fill ports are illustrated in which the gas fill ports pass through the housing 14 and include various types of plugs sealing off the gas fill ports. The term "plug" as used herein refers to anything that can cover or seal a hole with a high degree of hermeticity such as a disk, a ball, a pin, a cup or other shape.

In FIG. 2, a fill port 50 through a housing 14 of a transmitter is sealed by a cup-shaped disk 52. Disk 52 serves as a plug for fill port 50. Disk 52 includes a tab 54 that is attached to the housing 14 by a fastener 56 that can be a screw, a rivet or a spot weld. The disk 52 includes a deflectable portion 58 that is easily visible outside the transmitter. When fill gas 48 is adequately pressurized, the deflectable portion 58 is visibly deflected by the pressure. A technician can observe a lack of deflection to see if hermeticity has been lost, and can then replace a leaky transmitter before the transmitter output fails due to contamination. Disk 52 is sealed to the housing 14 by a preformed layer of solder or braze material 60. After the cavity is filled or pressurized, the disk 52 is selectively heated to melt the material 60 and form a metal-to-metal seal with high hermeticity.

FIG. 3 illustrates an alternative placement of a capillary tube 62 in a housing 14. The capillary tube 62 is brazed, soldered or welded to the-housing 14 at 64 to form a fill port. After the cavity is filled or pressurized, the outer end 66 of the capillary tube 62 is sealed with a plug 68 of material such as solder, braze or weldment.

FIG. 4 illustrates a housing 14 with a fill port 70 passing through it. A coated ball 72 serves as a plug for the fill port 70. Ball 72 is coated with a sealing material 74 such as solder or braze material. A spring 73 pushes the ball 72 toward the fill port 70. A small tool (not illustrated) can be inserted to temporarily push the ball 72 away from the fill port 70 so that fill gas 48 can be let in the cavity. The tool is removed, and the ball 72 is selectively heated to melt the material 74 to form a seal to housing 14 with high hermeticity.

In FIG. 5, the fill port is a throughhole 80 through the housing 14, and the throughhole 80 is sealed by a plug 82. Plug 82 is a pin that is joined to the housing 14 by solder, braze or weld 84. Plug 82 can be secured by a press fit, by threads, or by the melted metal seal.

Figure 6:
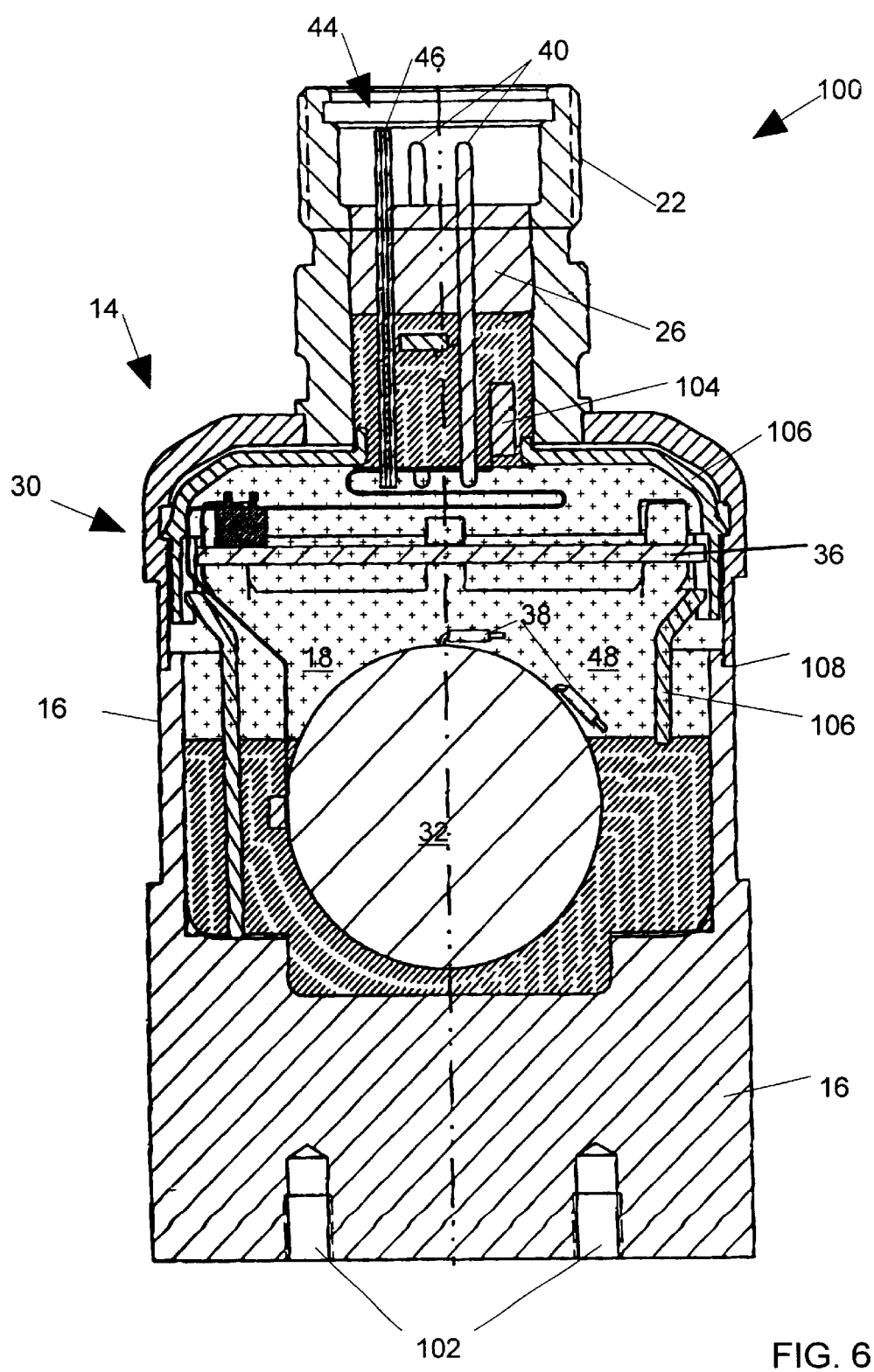
FIGS. 6–7 are front and side cross-sectional views of a second embodiment of a pressure transmitter.
Figure 7:
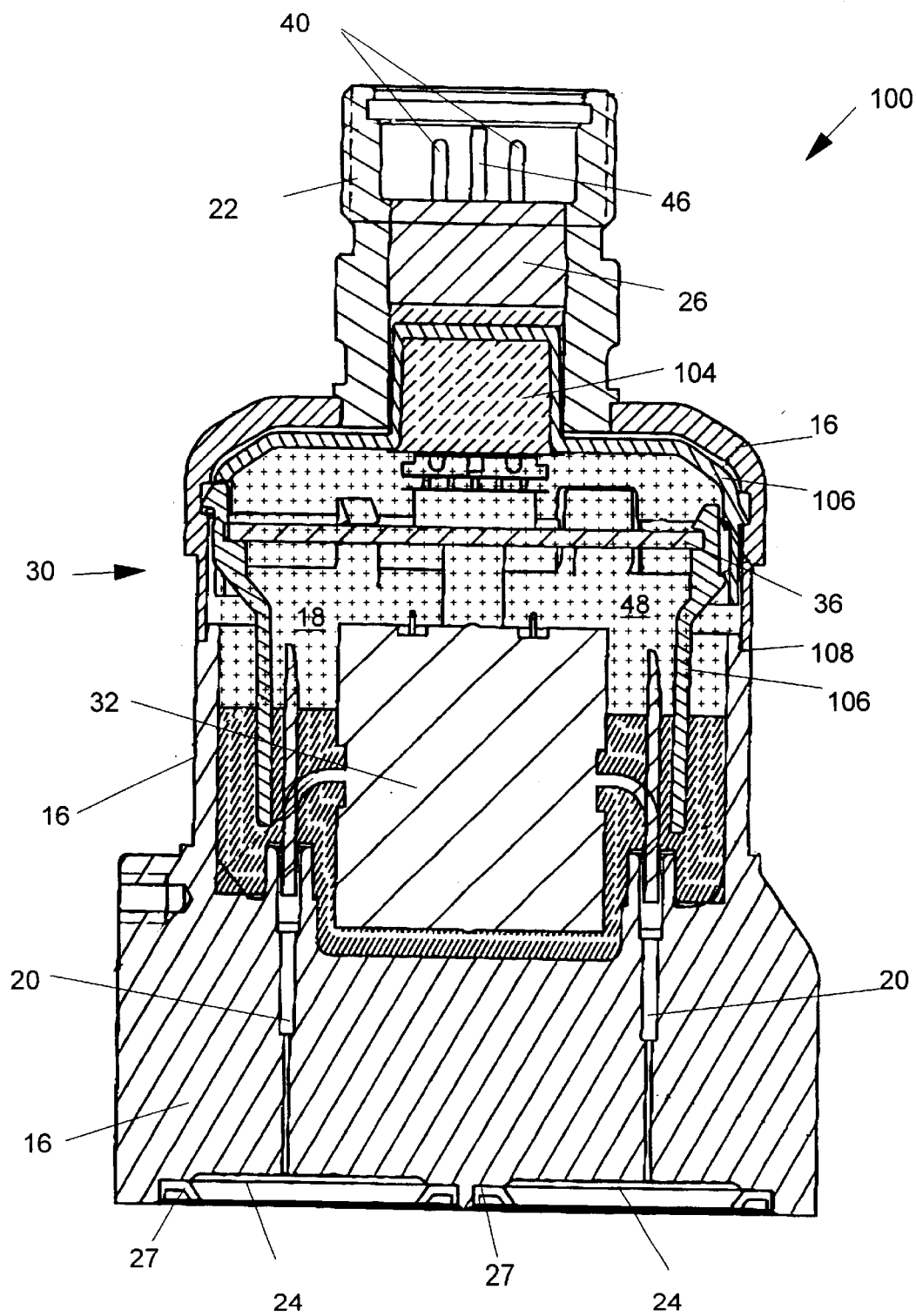

In FIGS. 6–7, front and side cross-sectional views of a second embodiment of a pressure transmitter 100 are illustrated. Reference numerals used in FIGS. 6–7 that are the same as reference numerals used in FIG. 1 identify the same or similar features. Transmitter 100 is a differential pressure transmitter and has two coplanar isolator diaphragms 24, and two pressure inlets 20 leading to a pressure sensor 32. Pressure sensor 32 can comprise a capacitive differential pressure sensor mounted in potting compound as shown. The transmitter 100 includes bolt holes 102 that can be used for attaching a coplanar flange or manifold to transmitter 100. In transmitter 100, a heat generating component 104 is heat sunk to connector shell 22 to improve heat dissipation. Plastic shrouds 106 are disposed in the cavity 18 to control heat flow. Housing 16 is permanently assembled and sealed at a circular weld 108.

Pressure transmitter 100 includes a sealed housing 14 surrounding a cavity 18. Fill gas 48 is free of integrated circuit contaminants and fills open spaces in the cavity 18. A sensor circuit 30 includes an integrated circuit 34 disposed in the cavity 18 where the integrated circuit 34 is protected from contaminated atmospheres outside the pressure transmitter 100. A gas fill port 46 on the sealed housing 14 is permanently sealed, retaining the fill gas 48 in the housing 14. A sealed electrical feedthrough 26 is provided such that the sensor circuit 30 is electrically adjustable without opening the sealed housing 14.

Figure 8:
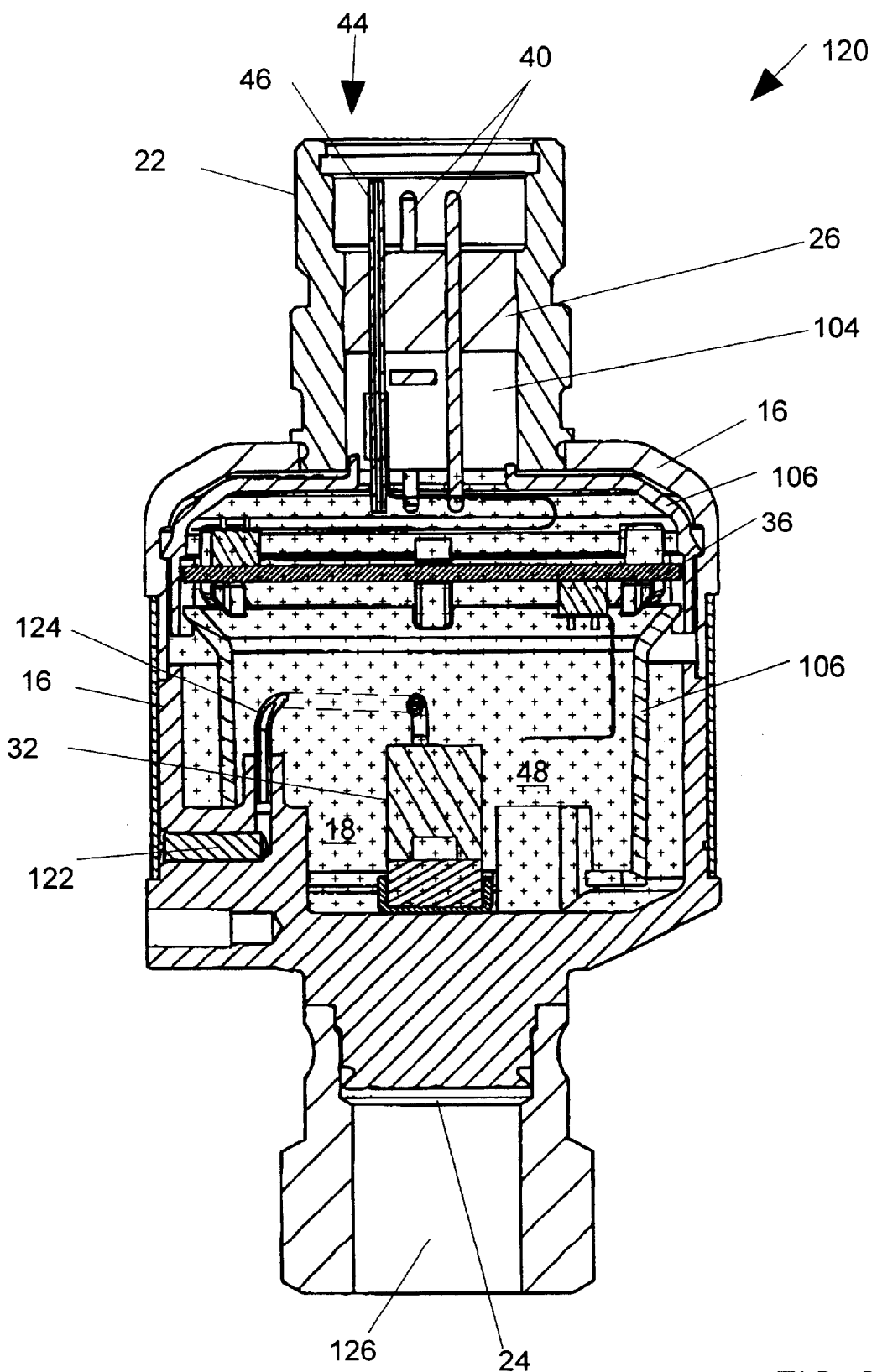
FIGS. 8–9 are front and side cross-sectional views of a third embodiment of a pressure transmitter.
Figure 9:
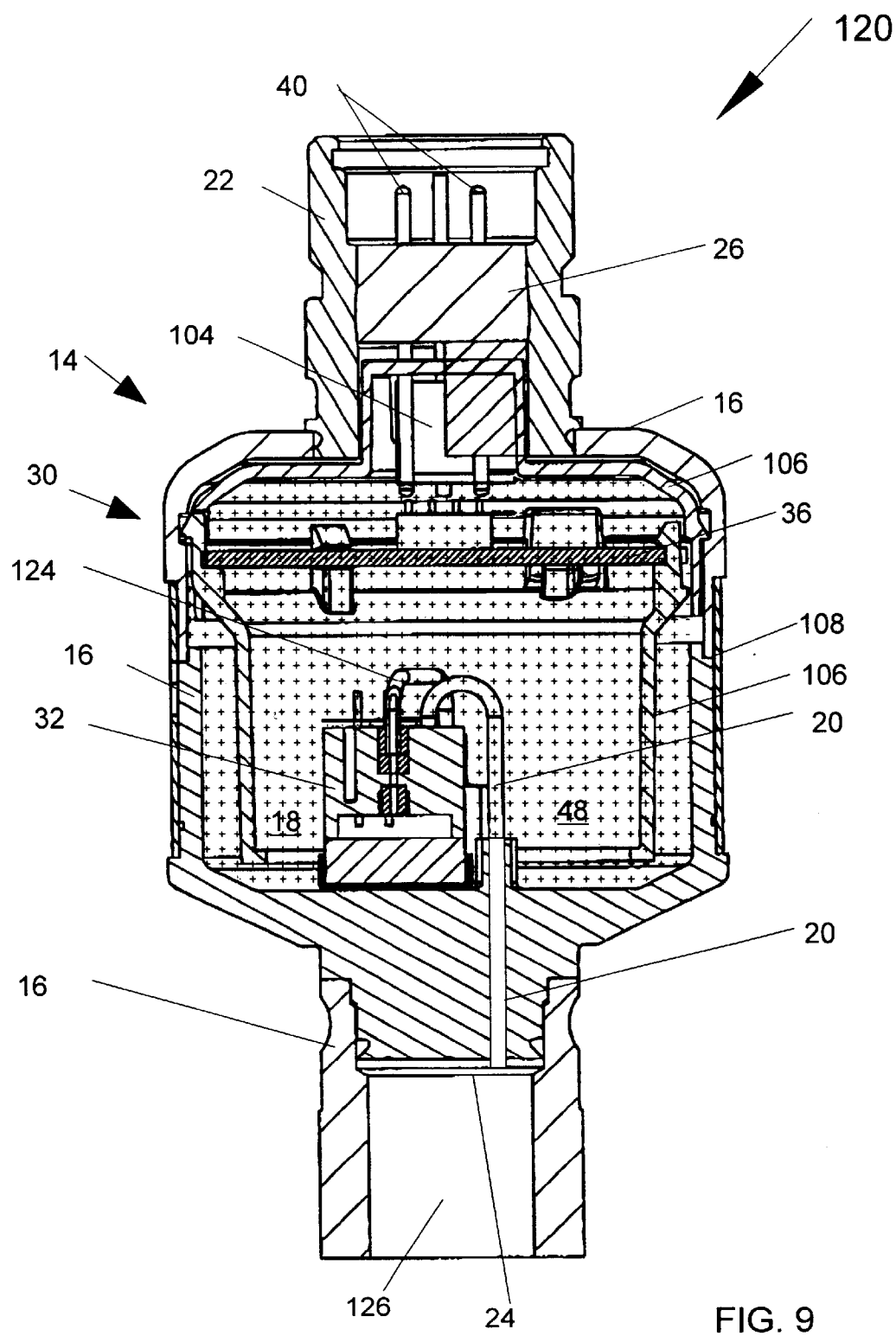

In FIGS. 8–9, front and side cross-sectional views of a third embodiment of a pressure transmitter 120 are illustrated. Reference numerals used in FIGS. 8–9 that are the same as reference numerals used in FIGS. 7–8 identify the same or similar features. Transmitter 120 is a gauge pressure transmitter and has one isolator diaphragm 24 in an internally threaded process fluid fitting 126. A second, or backside, pressure inlet of pressure sensor 32 is connected by a tube 124 to an atmospheric vent port 122. Pressure sensor 32 can comprise a capacitive differential pressure sensor mounted in a sealed pressure sensor housing as shown. Pressure transmitter 120 senses a difference between process fluid pressure at isolator diaphragm 24 and atmospheric pressure at atmospheric vent port 122. Tube 122 is sealed so that the fill gas 48 is contained and does not leak out the atmospheric vent port 122.

Pressure transmitter 120 includes a sealed housing 14 surrounding a cavity 18. Fill gas 48 is free of integrated circuit contaminants and fills open spaces in the cavity 18. A sensor circuit 30 includes an integrated circuit 34 disposed in the cavity 18 where the integrated circuit 34 is protected from contaminated atmospheres outside the pressure transmitter 100. A gas fill port 46 on the sealed housing 14 is permanently sealed, retaining the fill gas 48 in the housing 14. A sealed electrical feedthrough 26 is provided such that the sensor circuit 30 is electrically adjustable without opening the sealed housing 14.

The pressure transmitters 10, 100, 120 of FIGS. 1, 6–9 are readily manufacturable. A sensor circuit 30 including a pressure sensor 32 and electrical contacts 40 coupled to an integrated circuit 34 are assembled in a portion of the housing 14. The contacts are adapted to transmit a transmitter output and also receive an electrical adjustment signal. The housing 14 is provided with an outer wall 16 surrounding the integrated circuit 34. The outer wall 16 is provided with a fluid pressure inlet 20 and a connector shell 22 passing through the wall 16. The housing 14 includes an isolator seal 24 over the fluid pressure inlet and also a feedthrough seal 26 in the connector shell 22. A fill port 46 is provided that seals the fill gas 48 in the housing 14 permanently. Open spaces in the cavity are filled with the fill gas 48 that is substantially free of integrated circuit contaminants. The fill port 46 is permanently sealed off and the sealed fill port completes a permanently hermetically sealed, electrically adjustable transmitter 10, 100, or 120.

The fill port 46 can be used to pressurize the cavity 18 of transmitter 10, 100 or 120 during manufacture to check for leaks. Cavity 18 can be then be evacuated using a vacuum pump to remove substantially all traces of gaseous contaminants such as moisture. Finally, the vacuumized cavity 18 can be back-filled with a gas that is free of integrated circuit contaminants and the fill port can then be permanently sealed by welding, soldering or brazing.

Although the present invention has been described with reference to preferred embodiments, workers skilled in the art will recognize that changes may be made in form and detail without departing from the spirit and scope of the invention. Pressure sensors other than capacitive pressure sensors can be used, for example, resistive strain gages. In some cases, a single sensor will provide both a pressure and a temperature output. Features illustrated in one embodiment can be appropriately adapted to other illustrated embodiments.

What is claimed is:

1. A pressure transmitter, comprising
   a permanently sealed pressure transmitter housing surrounding a cavity;
   a fill gas filling open spaces in the cavity, the gas being free of integrated circuit contaminants;
   a sensor circuit including a pressure sensor and an integrated circuit disposed in the cavity and protected by the permanently sealed housing from contaminated atmospheres outside the pressure transmitter;
   a gas fill port on the sealed housing that is permanently sealed, retaining the fill gas in the housing; and
   a sealed electrical feedthrough including an electrical connector shell passing through the sealed housing and electrical contacts coupling to the integrated circuit such that the sensor circuit is electrically adjustable via the electrical contacts without opening the sealed housing.

2. The pressure transmitter of claim 1 wherein the integrated circuit comprises a non-hermetic integrated circuit package.

3. The pressure transmitter of claim 1 wherein the gas fill port is a capillary tube with a closed end.

4. The pressure transmitter of claim 1 wherein the fill gas includes a dry gas selected from the group of air, nitrogen and inert gasses.

5. The pressure transmitter of claim 1 wherein the fill gas is free of oxygen and the housing is explosion proof.

6. A pressure transmitter, comprising:
   a permanently sealed pressure transmitter housing having an outer wall surrounding a cavity, the outer wall having a fluid pressure inlet and a connector shell passing therethrough; the permanently sealed pressure transmitter housing including an isolator seal over the fluid pressure inlet and a feedthrough seal in the connector shell;

a sensor circuit including a pressure sensor coupled to the fluid pressure inlet and an integrated circuit disposed in the cavity and coupled to the pressure sensor, the sensor circuit further including electrical contacts coupled to the integrated circuit and sealed in the feedthrough seal, the electrical contacts being adapted to transmit a transmitter output and receive an electrical adjustment signal; and a fill system including a fill port that is sealed in the permanently sealed pressure transmitter housing, and including a fill gas filling open spaces in the cavity, the fill gas being substantially free of integrated circuit contaminants and permanently sealed in the cavity.

7. The pressure transmitter of claim 6 wherein the integrated circuit comprises a non-hermetic integrated circuit package.

8. The pressure transmitter of claim 7 wherein the non-hermetic package is a surface mounted integrated circuit package.

9. The pressure transmitter of claim 7 wherein the non-hermetic package is a plastic integrated circuit package.

10. The pressure transmitter of claim 6 wherein the fill port passes through the feedthrough seal.

11. The pressure transmitter of claim 6 wherein the fill port passes through the outer wall.

12. The pressure transmitter of claim 6 wherein the fill port is a capillary tube with a closed end.

13. The pressure transmitter of claim 6 wherein the fill port is a throughhole through the permanently sealed pressure transmitter housing, the throughhole being sealed by a plug that is joined to the permanently sealed pressure transmitter housing by solder, braze or weld.

14. The pressure transmitter of claim 6 wherein the fill gas includes a dry gas selected from the group of air, nitrogen and inert gasses.

15. The pressure transmitter of claim 6 wherein the fill gas is free of oxygen and the permanently sealed pressure transmitter housing is explosion proof.

16. The pressure transmitter of claim 6 wherein the fill gas is pressurized at a gas pressure above atmospheric pressure.

17. The pressure transmitter of claim 16 wherein the permanently sealed pressure transmitter housing includes a deflectable portion that is visibly deflected by the gas pressure.

18. The pressure transmitter of claim 17 wherein the deflectable portion is a disk covering the fill port.

19. The pressure transmitter of claim 6, further comprising:

a quantity of desiccant material disposed in the cavity.

20. The pressure transmitter of claim 6 wherein the permanently sealed pressure transmitter housing and the isolator seal are formed of metal and are hermetically sealed to one another by a metal-to-metal joint selected from the group of welded, brazed and soldered joints.

21. The pressure transmitter of claim 6 wherein the connector shell is formed of metal and the feedthrough seal is formed of a ceramic, and the feedthrough seal is hermetically sealed to the connector shell by a ceramic-to-metal seal.

22. A process of manufacturing a pressure transmitter, comprising:

my providing a sensor circuit including a pressure sensor and electrical contacts coupled to an integrated circuit, the contacts being adapted to transmit a transmitter output and receive an electrical adjustment signal;

providing a permanently sealed pressure transmitter housing having an outer wall surrounding the integrated circuit, the outer wall having a fluid pressure inlet and a connector shell passing therethrough; the housing including an isolator seal over the fluid pressure inlet and a feedthrough seal in the connector shell;

providing a fill port that is sealed in the permanently sealed pressure transmitter housing;

filling open spaces in the cavity with a fill gas that is substantially free of integrated circuit contaminants; and permanently sealing the fill port to form a hermetically sealed, electrically adjustable transmitter.

* * * * *

UNITED STATES PATENT AND TRADEMARK OFFICE
CERTIFICATE OF CORRECTION

PATENT NO. : 6,609,427 B1
DATED : August 26, 2003
INVENTOR(S) : Brian L. Westfield et al.

It is certified that error appears in the above-identified patent and that said Letters Patent is hereby corrected as shown below:

Column 8,
Line 24, delete "my".

Signed and Sealed this

Twenty-seventh Day of April, 2004

JON W. DUDAS
*Acting Director of the United States Patent and Trademark Office*